July 13, 1965  H. F. BEDUERFTIG  3,194,439
VORTEX CAVITY SEAL FLOAT
Filed Sept. 5, 1963

Herman F. Beduerftig,
INVENTOR.

BY Harry M. Saragovitz
Edward J. Kelly
Herbert Berl
Harold W. Hilton

United States Patent Office 3,194,439
Patented July 13, 1965

3,194,439
VORTEX CAVITY SEAL FLOAT
Herman F. Beduerftig, Huntsville, Ala., assignor to the United States of America as represented by the Secretary of the Army
Filed Sept. 5, 1963, Ser. No. 306,965
5 Claims. (Cl. 222—66)
(Granted under Title 35, U.S. Code (1952), sec. 266)

The invention described herein may be manufactured and used by or for the Government for governmental purposes without the payment of any royalty thereon.

This invention relates generally to float valves and more particularly to a seal float for use in eliminating leakage through the vortex developed in a fluid when the fluid is drained from a pressurized tank or reservoir, as in rocket propellant feeding systems.

When fluid is drained from a tank or reservoir a vortex is formed as the fluid rotates axially about the draining point. The size and time of starting of the vortex depends on the prerotation of the fluid, size and configuration of the tank, and the quantity and density of fluid in the tank. In a pressurized vessel, the vortex sucks and drains the gas from above the surface of the liquid, thus disturbing and considerably decreasing the fluid flow rate. Even with extreme precaution taken to avoid prerotation, a vortex and draining of the gas as described above occurs in the last phase before the tank is empty. In applications such as launch vehicles and guided missiles, where the propellants have to be conveyed to the combustion chamber during the entire combustion process at a constant mixture ratio, the vortex and its disturbing features have to be avoided practically down to the empty tank. A minimum of residuals of propellants is of importance for the efficiency of the propulsion system.

Previous methods for eliminating this vortex disturbance have been directed toward the elimination of the fluid rotation. Such devices consist of cross type or horizontal baffles within the tank or a combination of both baffle types depending on tank design and complexity.

The present invention is directed toward sealing the cavity of the vortex rather than eliminating rotation of the fluid. The seal float of the present invention may rotate with the vortex, but closes it completely, thus preventing the draining of gas and disturbance of the flow rate.

An object of the present invention is to provide a device which seals the cavity of a whirling circular motion of a liquid being drained from a tank or reservoir.

A further object of this invention is to provide a device to maintain a predetermined gas pressure in a tank by positively sealing the vortex cavity as the liquid is withdrawn from the tank.

A still further object of the present invention is to provide a device to prevent dual phase (liquid and gas) flow into the pump feeding system, thus resulting in a smoother output pressure of the feeding system to serve the vibration sensitive combustion chamber of a rocket motor.

Still another object of the present invention is to maintain the suction capability of the pumping system down to the last drop in the tank, even down into the suction pipe, by preventing the occurrence of dual phase flow, thus not changing the flow rate or affecting the pump head. With proper design of tank bottom configuration, a minimum of residuals in tank and suction pipes of a propellant feeding system is assured, which is of importance for a highly efficient rocket propulsion system.

The above and other objects of this invention will become more fully apparent from the following detailed description taken in conjunction with the accompanying drawings, in which.

Figure 1:
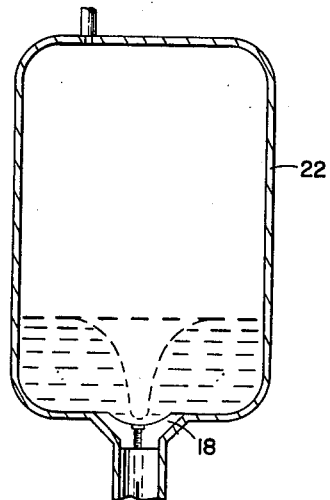
FIGURE 1 is a cross section of a tank or reservoir indicating the position and extent of a typical vortex action.
Figure 2:
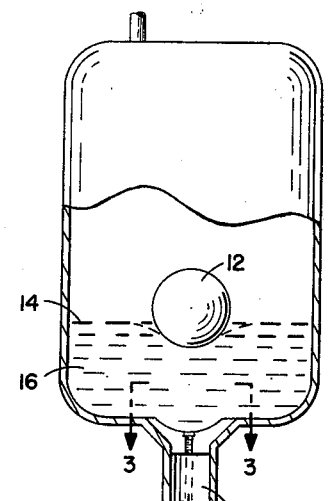
FIGURE 2 is a view similar to FIGURE 1 partially in section showing the action of the present invention in eliminating the vortex and the gas flow therethrough.
Figure 4:
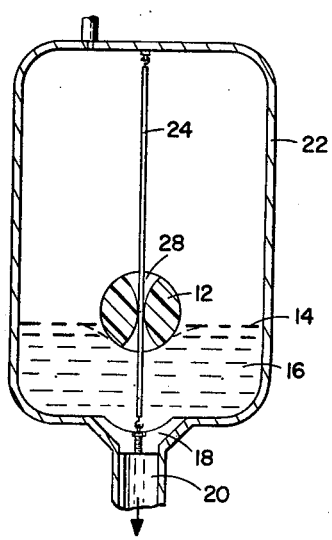
FIGURE 4 is a sectional view of the present invention showing a guide rod or rope in conjunction with the float seal to maintain the valve in the cavity of the vortex, and a cross in the outlet port to prevent closing of the outlet by the float at the lowest level of the liquid in the tank.
Figure 3:
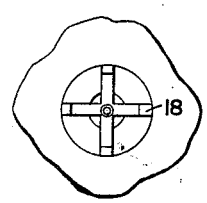
FIGURE 3 is an enlarged top view along line 3—3 of FIGURE 2.

As shown in FIGURES 2 and 4 the float seal comprises a spherical body 12 of such density and buoyancy that it will rest partially above and partially below the surface 14 of fluid 16. The buoyancy of body 12 must be such that it will remain above surface 14 of fluid 16 under any rotation or vortex action to which the fluid is subjected. Small cross baffles 18 are firmly affixed in the exit 20 of tank 22 to prevent the body 12 from coming in contact with the exit 20 and stopping flow therethrough. The flow in the pipe is turbulent and no vortex can develop under this condition.

As shown in FIGURE 4, body 12 is supported by a guide rod or rope 24 consisting of slideable mounting body 12 on guide rod 24 projected through an axial bore 28 in body 12. Guide rod 24 is extended through body 12 and is in turn flexibly mounted to baffle cross 18 at the bottom and in similar way at the top of the tank as shown in FIGURE 4.

It is to be understood that the material of body 12 is such to be compatible with propellants such as alcohol, kerosene, liquid hydrogen, liquid oxygen, etc. In the case of the fuels the material may be polysulfide rubbers. In the case of liquid oxygen the material may be "Teflon".

It is obvious that configurations other than spherical may be used to achieve the same results as the invention described above. The shape may be determined experimentally and will vary for each tank configuration and various conditions to which the tank is subjected. The shape of the bore of the sphere may also be determined experimentally.

Obviously many modifications and variations of the present invention are possible in the light of the above teachings. It is therefore to be understood that within the scope of the appended claims the invention may be practiced otherwise than as specifically described.

I claim:

1. A device comprising a liquid containing tank having inlet and outlet ends, said inlet end disposed in communication with a source of gas pressure for pressurizing said liquid in said tank by being in direct contact with an upper surface of said liquid at all times, said outlet end disposed for draining liquid from said tank, a buoyant body carried on the surface of said liquid at all levels and retained for rotation with the vortex created in response to draining of the liquid to reduce the amount of vortexing at all liquid levels and thereby provide a more uniform liquid head at all levels, said body being aligned with the vortex cavity responsive to the rotation to completely seal off the cavity and prevent loss of pressurizing gas therethrough and thus maintain substantially constant tank pressure, flow rate of said liquid, and liquid surface configuration.

2. A device as in claim 1 wherein said outlet end is provided with a pair of cross members secured thereto and extending slightly into said outlet at the bottom of said tank and disposed for preventing said buoyant body from contacting said bottom of said tank and stopping the liquid flow through said outlet end.

3. A device as in claim 1 wherein said tank is provided with an element for support of said body for unrestrained vertical and rotational movement to maintain said body in the cavity of said vortex.

4. A device as in claim 3 wherein said element provided for support of said body includes a guide rod flexibly affixed to the lower and upper portion of said tank, said body provided with an axial bore, said rod projecting through said bore for slideable support of said body.

5. A device as in claim 1 wherein said body is of a compatible compound to be used with rocket propellants.

References Cited by the Examiner
UNITED STATES PATENTS

| | | | |
|---|---|---|---|
| 284,172 | 9/83 | Brainerd | 222—564 |
| 2,049,909 | 8/36 | Kirschner | 137—433 X |
| 2,063,727 | 12/36 | Davis | 222—66 X |
| 2,294,543 | 9/42 | Ellis | 222—66 X |
| 2,980,295 | 4/61 | Sacco | 222—66 |

LOUIS J. DEMBO, *Primary Examiner.*

HADD S. LANE, *Examiner.*